United States Patent [19]

Maier et al.

[11] 4,298,852

[45] Nov. 3, 1981

[54] CIRCUIT BREAKER WITH INTERCHANGEABLE RATING ADJUSTER AND INTERLOCK MEANS

[75] Inventors: Alfred E. Maier, Chippewa; Alan B. Shimp, Monroeville; David J. Uram, Penn Hills, all of Pa.

[73] Assignee: Westinghouse Electric Corp., Pittsburgh, Pa.

[21] Appl. No.: 68,771

[22] Filed: Aug. 21, 1979

Related U.S. Application Data

[63] Continuation of Ser. No. 853,940, Nov. 23, 1977, abandoned.

[51] Int. Cl.[3] ...................... H01H 9/24; H01H 33/48; H02H 3/08

[52] U.S. Cl. .................................... 335/6; 200/50 A; 335/160; 361/100

[58] Field of Search .......................... 335/6, 160, 172; 361/96, 100; 200/50 A, 50 AA

[56] References Cited

U.S. PATENT DOCUMENTS 3,826,951 7/1974 Mater et al. ......................... 361/100

4,037,184 7/1977 Kempisty et al. .................. 335/172

*Primary Examiner*—Harold Broome

*Attorney, Agent, or Firm*—Robert E. Converse, Jr.

[57] ABSTRACT

A circuit breaker comprises an adjustable trip unit having electronic circuitry for initiating a tripping command upon detection of overcurrent conditions. The trip unit includes an externally accessible interchangeable plug-in rating adjuster removably supported on the housing of the circuit breaker by a threaded rod and tube. An interlock mechanism cooperates with the trip bar of the circuit breaker and secured mechanism to insure that only when a compatible rating adjuster is properly seated in the housing and the threaded rod is completely engaged within the threaded tube will the circuit breaker mechanism be removed from the trip-free condition. Coordination of a proper rating adjuster with a corresponding trip unit and circuit breaker is achieved by coordinating the lengths of the rod and tube and the position of the threaded portions thereof such that only a rating adjuster which is electrically compatible with a particular circuit breaker and trip unit will properly engage the threads of the tube to remove the circuit breaker from the trip-free condition.

16 Claims, 11 Drawing Figures

CIRCUIT BREAKER WITH INTERCHANGEABLE RATING ADJUSTER AND INTERLOCK MEANS

This is a continuation of application Ser. No. 853,940, filed Nov. 23, 1977, now abandoned.

CROSS REFERENCE TO RELATED APPLICATIONS

The present invention is related to material described in copending U.S. patent application Ser. No. 853,983 entitled "Circuit Breaker With Replaceable Trip Unit" filed Nov. 23, 1977 by J. J. Matsko et al; U.S. patent application Ser. No. 853,991 entitled "Circuit Interrupter With Trip Unit Having Improved Adjustment Means" filed Nov. 23, 1977 by J. J. Matsko et al; U.S. patent application Ser. No. 728,088 entitled "Circuit Breaker Apparatus Incuding Asymmetrical Fault Detector" now U.S. Pat. No. 4,104,691, filed Sept. 30, 1976 by A. B. Shimp et al; U.S. patent application Ser. No. 811,227 entitled "Trip Mechanism Reset" now U.S. Pat. No. 4,121,077; filed June 29, 1977; and U.S. patent application Ser. No. 853,990 entitled "Circuit Interrupter With Interlocked Interchangeable Trip Unit" now U.S. Pat. No. 4,210,887, filed Nov. 23, 1977 by R. H. Hill et al. Each of the above-mentioned applications is assigned to the assignee of the present invention.

BACKGROUND OF THE INVENTION

1. Field of the Invention

The invention relates generally to electrical apparatus, and, more particularly, to circuit breakers having an adjustable trip rating.

2. Description of the Prior Art

Circuit breakers are widely used to protect electrical circuits from damage due to overload currents by opening the breaker contacts whenever current therethrough exceeds the trip current rating of the breaker. In order to reduce the number of circuit breaker types needed, it is desirable to provide circuit breakers having adjustable trip current ratings. This allows a single type of breaker to be applied on a variety of circuits having different load current ratings. In addition, it is sometimes desired to provide a circuit breaker of a certain rating at the time of installation of the electrical system, yet plan for future growth of the system by providing the capability to adjust the circuit breaker rating upward as additional loads are installed.

Some problems are incurred with adjustable circuit breakers, however. For example, if a circuit breaker and cable system are installed, each having an 800 ampere rating and the breaker is later adjusted upward to a 1,600 ampere rating, it is possible for overload currents to occur which will damage the conductors of the system and yet not trip the circuit breaker. Therefore, some type of control is necessary to prevent unauthorized circuit breaker adjustment.

Various solutions to this problem have been implemented in the prior art. One example is the adjustable circuit breaker described in U.S. Pat. No. 3,826,951 issued July 30, 1974 to Maier and Shimp and assigned to the present assignee. In the device described therein, an externally accessible plug-in type replaceable rating adjuster is provided to establish the trip current rating of the circuit breaker. If it is desired to change the trip current rating, the rating adjuster is removed and a different adjuster reinserted to change the operating characteristics of the circuit breaker trip unit and alter the trip current rating. In order to insure that only a proper rating adjuster is inserted into the breaker, each rating adjuster was provided with a small key protruding from one part of its housing. Each circuit interrupter was in turn provided with a recess or keyway in the breaker enclosure such that the key protrusion of a permitted rating adjuster would line up with and slide into the keyway, allowing the rating adjuster to be fully inserted into the circuit breaker. The keys and keyways of noncompatible rating adjusters and circuit breakers would not line up, thereby preventing complete insertion of the rating adjuster into the breaker housing. The mechanism was designed such that if the rating adjuster were not fully inserted into the breaker housing, the circuit breaker mechanism would remain in the trip-free condition to prevent the breaker contacts from closing.

The combination of the circuit breaker and rating adjuster having cooperating keys and keyways in their respective housings provides excellent service. However, a different shape of housing was required for each rating type of circuit breaker and rating adjuster. Thus, in a molded case breaker, a separate mold is required for each rating of breaker although the physical size of the breaker is the same. This, of course, significantly raises the cost of manufacturing a complete line of circuit breakers.

It would therefore be desirable to provide a circuit breaker having an adjustable rating and a common housing for all ratings of circuit breakers, thereby allowing a single mold to be used in the manufacture of each breaker.

SUMMARY OF THE INVENTION

In accordance with a preferred embodiment of the present invention, there is provided a circuit interrupter comprising a housing containing a circuit breaker structure having a pair of separable contacts operable between open and closed positions to interrupt an electrical circuit. A releasable trip mechanism having an interiorly threaded tube attached thereto is operable from a latched to a tripped position to automatically open the contacts. Means are provided for sensing current flow through the breaker and for supplying a signal to an electronic trip current mounted within the housing which is operable upon detection of overcurrent conditions to actuate the trip means and separate the contacts. The trip unit comprises a cavity adapted to receive a removable rating adjuster. When inserted, the rating adjuster acts in conjunction with the electronic trip circuit to establish the trip current rating of the breaker. The rating adjuster also includes a mounting rod threaded to cooperate with the interiorly threaded tube. Interlock means connected to the trip mechanism are operably associated with the tube and rod so that the trip mechanism is held in a trip-free condition preventing the contacts from being operated to a closed position except when the rating adjuster is completely inserted into the trip unit and the threaded portion of the tube engaged and drawn up by the threaded rod. The positions of the threaded portions of the rod and tube, respectively, are selected such that only a rating adjuster containing electrical components compatible with the trip unit of the specific breaker can be completely inserted into the housing such that the tube and rod completely engage to remove the trip mechanism from the trip-free condition.

The trip unit can be a removable replaceable trip unit such that the rating adjuster can only be inserted into the trip unit and the tapped tube and threaded rod completely engaged when the trip unit is properly inserted into the circuit breaker housing. Thus, the trip mechanism remains in a trip-free condition unless the trip unit is properly installed in the breaker housing.

Similarly, the rating adjuster may be provided with a projection extending over the circuit housing cover such that the cover can only be removed after removal of the rating adjuster, thereby placing the trip mechanism in a trip-free condition and insuring that the circuit breaker contacts are in the open position whenever the breaker cover is removed.

DESCRIPTION OF THE PREFERRED EMBODIMENT

Figure 1:
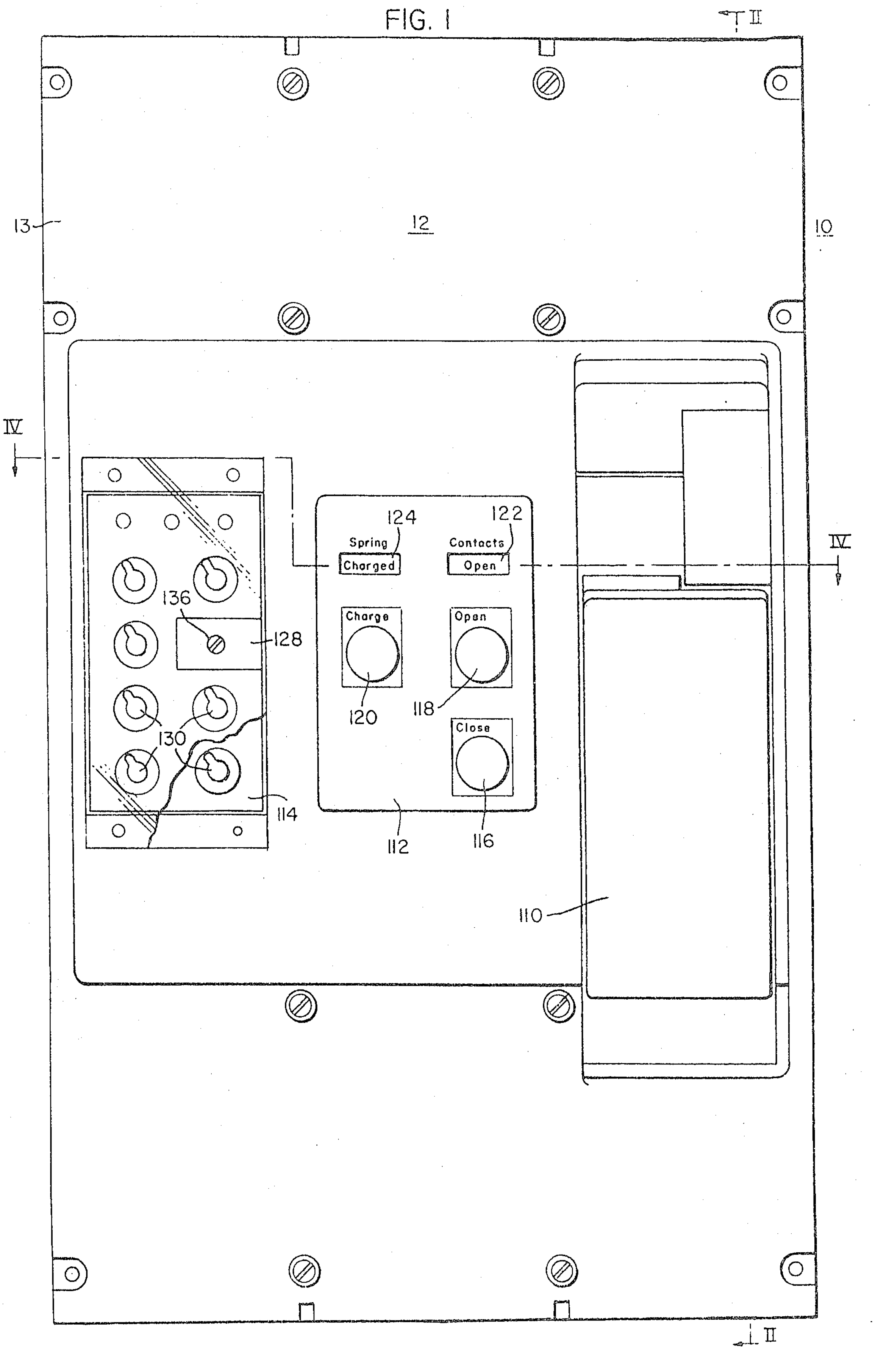
FIG. 1 is a front-elevational view of a circuit interrupter employing the principles of the present invention.
Figure 2:
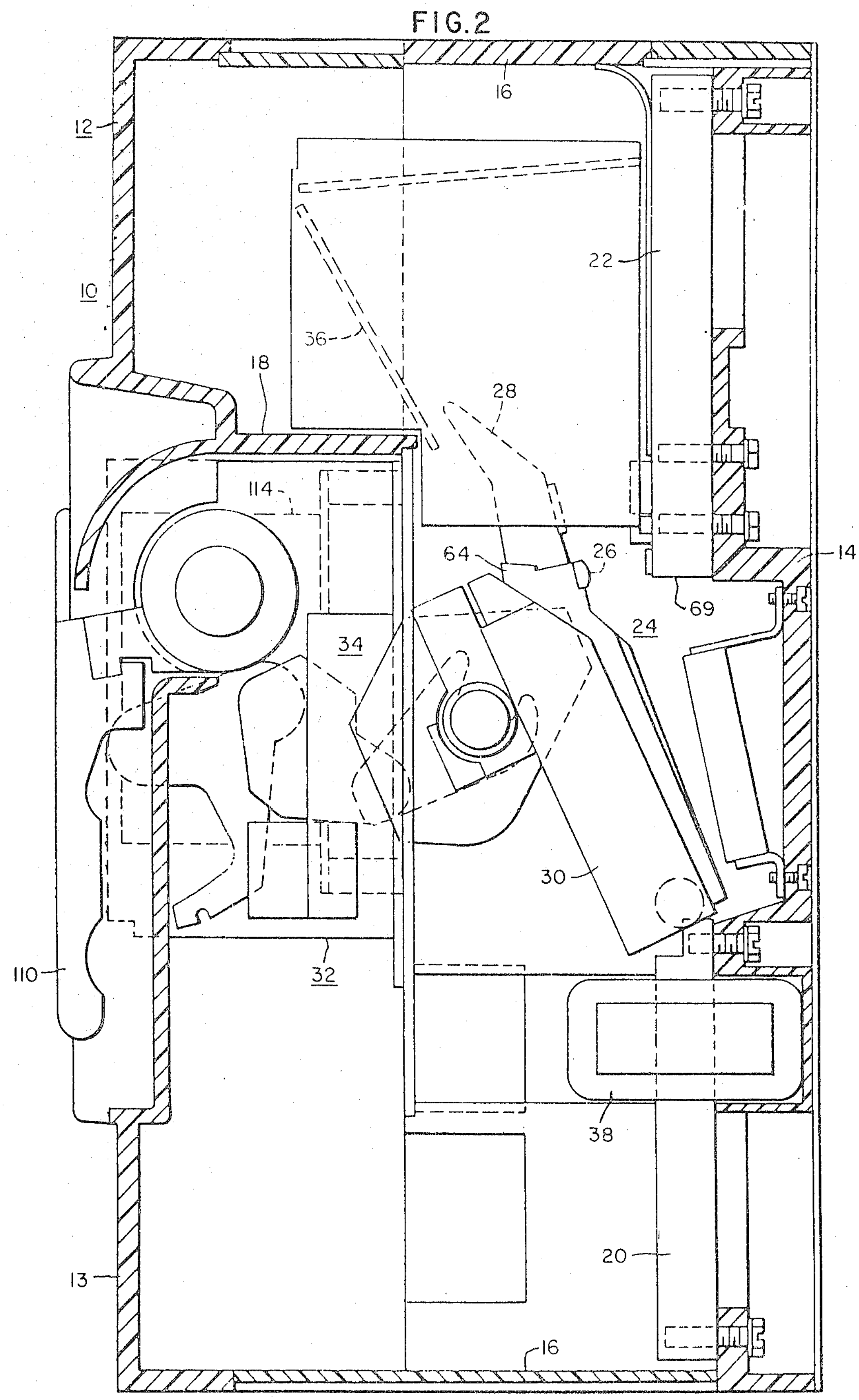
FIG. 2 is a side-sectional view of the circuit breaker of FIG. 1, taken along the line II—II of FIG. 1.

Referring now to the drawings, in which like reference characters refer to corresponding members, there is shown in FIGS. 1 and 2 a stored energy molded case circuit breaker 10 constructed in accordance with the principles of the present invention. Although the description of the invention is made with reference to this particular circuit breaker, it is to be understood that the invention is applicable to circuit breakers generally. The circuit breaker 10 includes a housing 12 comprising a cover 13, a mounting base 14, and side walls 16. A pair of stationary contacts 20, 22 are disposed within the housing 12. Stationary contact 22 would, for example, be connected to an incoming power line (not shown), while the other stationary contact 20 would be connected to the load (not shown). Electrically connecting the two stationary contacts 20, 22 is a movable contact structure 24. Movable contact structure 24 comprises a movable contact 26, a movable arcing contact 28, and a contact carrier 30. The movable contact 26 and the arcing contact 28 are pivotally secured to the stationary contact 20, and are operable between open and closed positions with respect to the stationary contact 22. Throughout this specification, the term "open" is used with respect to the contact positions means that the movable contacts 26, 28 are spaced apart from the stationary contact 22, whereas the term "closed" indicates the position wherein the movable contacts 26, 28 are contacting both stationary contacts 22 and 20. The movable contacts 26, 28 are mounted to and carried by the contact carrier 30 and contact holder 64.

Also included within the circuit breaker 10 is an operating mechanism 32, a toggle means 34, and an arc chute 36 which extinguishes any arc which may be present when the movable contacts 26, 28 are operated from the closed to the open position. A current transformer 38 is utilized to monitor the amount of current flowing through the stationary contact 20.

FIG. 1 shows the front of the cover 13 and the relative positions of an operating handle 110, a control panel 112, and a trip unit 114. The handle 110 is used for manual operation to charge powerful operating springs (not shown) providing stored energy to move the contacts 26, 28 between open and closed positions. This movement is controlled from the control panel 112 which includes push buttons 116, 118, 120 and indicating flags 122 and 124. The button 120 is used to activate a motor (not shown) which can perform the same operation as the handle 110 to charge the operating springs. When the springs are so charged, this status is indicated by the flag 124. Manual operation of the push button 116 or 118 will serve to discharge the operating springs and move the contacts 26, 28 between the open and closed positions. Such operation thus provides a switching function during periods of normal conditions.

During overload current conditions on the circuit, the contacts 26, 28 will move automatically from the closed to the open position. The characteristics of this tripping operation are controlled by the trip unit 114 which contains electronic circuitry to process the sensing signals produced by the transformer 38. This circuitry is described more completely in the aforementioned U.S. patent application Ser. No. 728,088. The nominal level of current which will initiate the tripping operation, i.e., the trip current rating, is determined by a removable plug-in rating adjuster 128 which contains resistance means cooperating with the electronic circuitry within the trip unit 114 to establish the trip current rating. Other characteristics of the trip unit are adjustable through the use of controls 130, more completely described in the aforementioned copending U.S. patent application Ser. No. 853,991.

Figure 6:
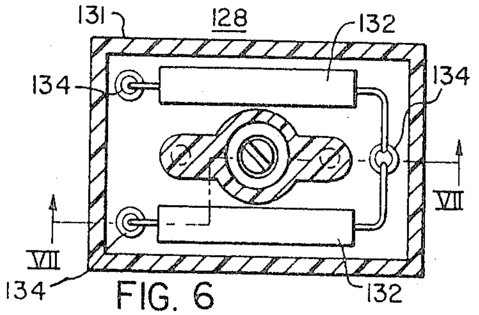
FIG. 6 is a sectional view of the replaceable rating adjuster taken along the line VI—VI of FIG. 3A.
Figure 7:
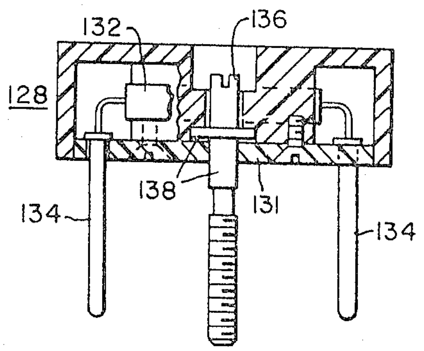
FIG. 7 is a sectional view of the rating adjuster shown in FIG. 6, taken along the line VII—VII.
Figure 4:
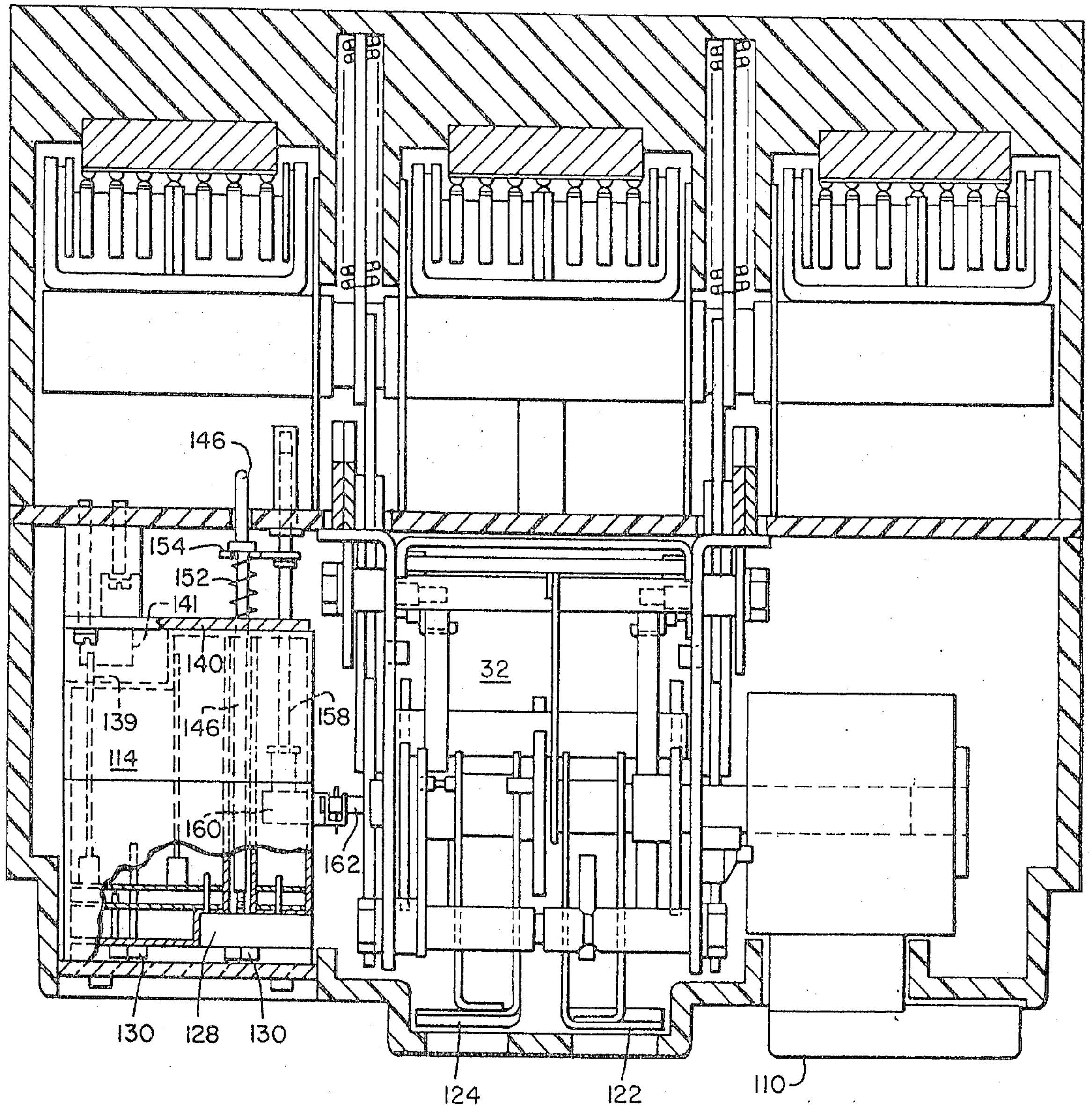
FIG. 4 is a sectional view of the circuit interrupter taken substantially along the line IV—IV of FIG. 1.

The construction of the rating plug 128 is seen most clearly in FIGS. 6 and 7. A housing of molded insulating material having a base 131 and cover 131A contains a pair of resistors 132 supported upon plug-in connecting pins 134. A treaded rod or screw 136 extends through the housing 131 and is movably captivated by cover 131A and base 131 to push or pull the plug.

Figure 3A:
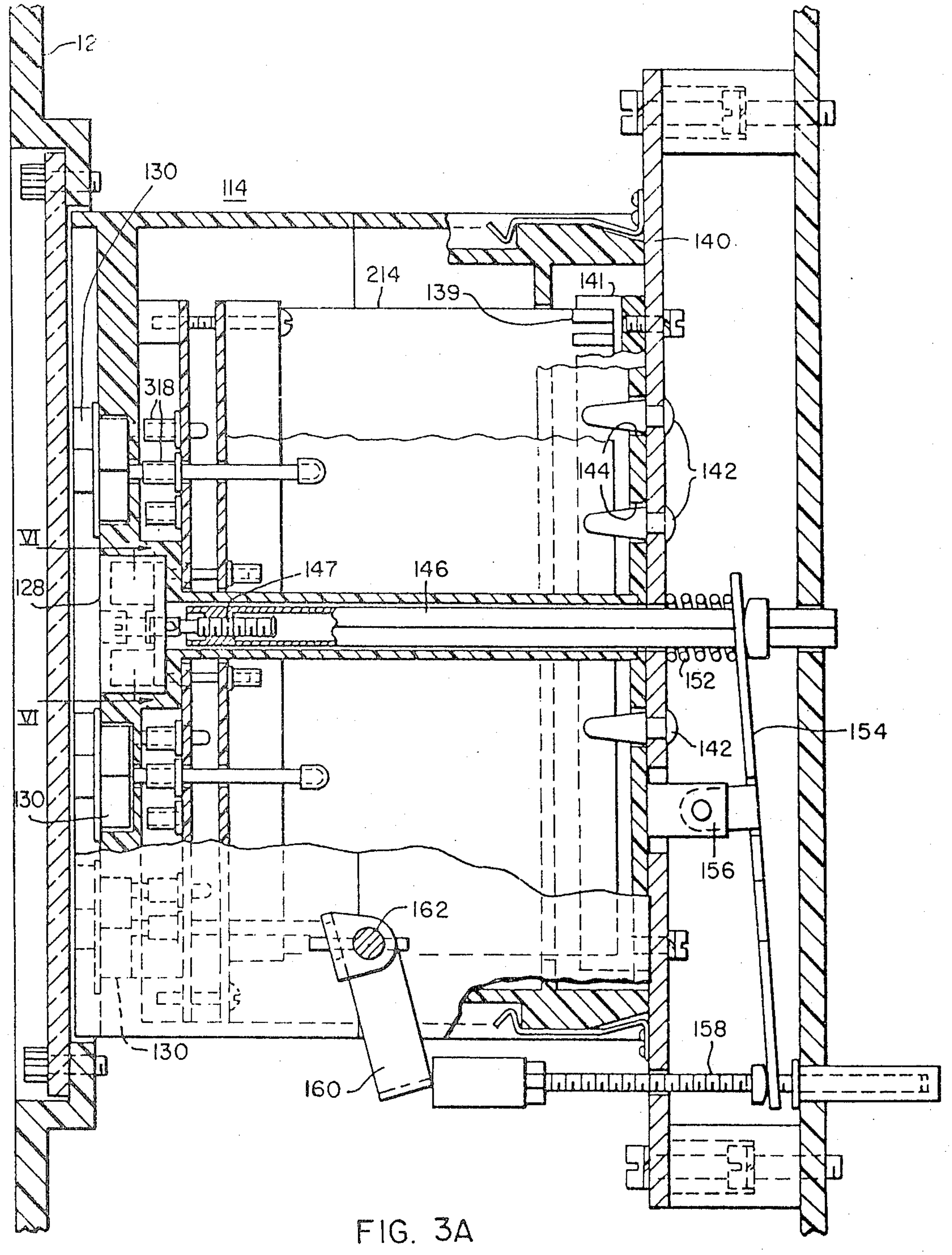
FIG. 3A is a detailed side-sectional view of the trip unit portion of the circuit interrupter shown in FIGS. 1 and 2.
Figure 5:
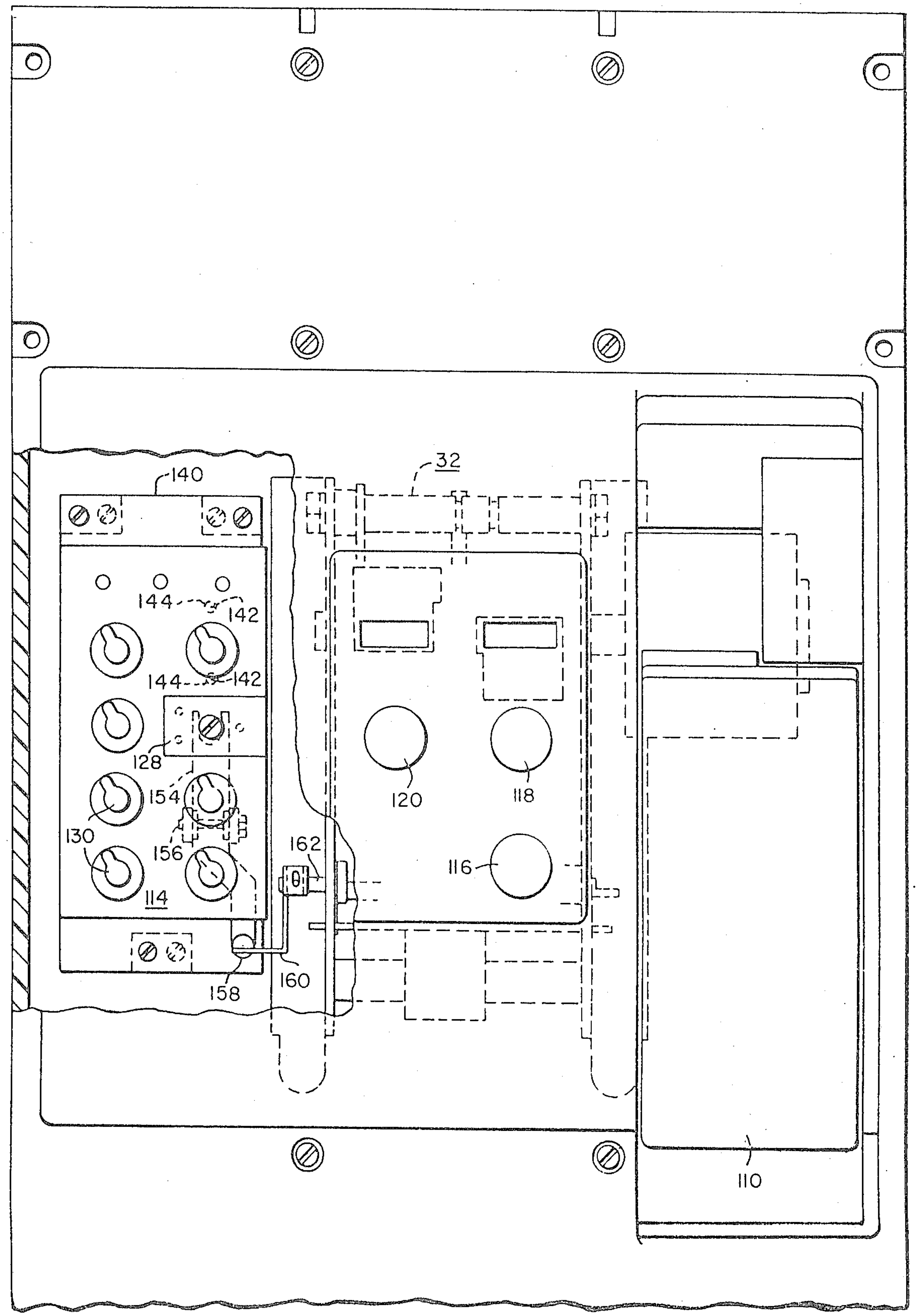
FIG. 5 is a view similar to FIG. 1 with portions cut away to show the lever mechanism of FIGS. 3A-3D.

Referring now to FIG. 3A, it can be seen that the trip unit 114 is seated in a recess of the housing 12 and rests upon a steel mounting plate 140. Electronic circuitry within the trip unit 114 is joined through plug-in connectors 139, 141 to the sensing transformer 38 (FIG. 2) and the conductors 22, supplying signal and power to the circuitry. The trip unit 114 is located in the housing recess by rejection pins 142 mounted upon and extending upward from the plate 140. Corresponding holes 144 (FIG. 5) are drilled in the bottom of the trip unit housing. The pins and holes 142 and 144 are arranged in identical patterns such that the pins are received by the holes. Circuit interrupters having different electrical characteristics such as ground fault detection capability, higher interruption rating, etc., have rejection pins 142 arranged in different patterns. Similarly, different trip units 114 having electrical characteristics corresponding to the circuit interrupters have different patterns of holes 144. In each case, the pin pattern and hole pattern for compatible circuit interrupters and trip units is the same, such that only trip units having circuitry compatible with the particular circuit interrupter can be properly inserted in the housing 14. If a non-compatible trip unit is attempted to be inserted, the pins 142 and holes 144 will not line up and the trip unit cannot be seated in the housing. Thus, a common mold can be used for all circuit breaker housing and all trip unit housing while still maintaining a rejection capability to prevent mating of non-compatible trip units and circuit breakers.

As can be seen in FIG. 3A, a hexagonally sectional tapped tube 146 having an interiorly threaded portion 147 extends through a hexagonally shaped hole in the mounting plate 140. The tube 146 is free to move back and forth but is prevented from rotating within the hole. Alternatively, the tube 146 could be prevented from rotating in the hole by a pin inserted through the tube which would ride in a slotted bushing attached to the mounting plate. A compression spring 152 is mounted around the tapped tube 146. The tube 146 rides upon a lever 154 pivotally mounted at 156 to the mounting plate 140. The other end of the lever 154 is connected to a push rod 158 which is in turn connected to a lever 160 attached to the trip arm 162 of the circuit breaker mechanism 32. As is described in the aforementioned copending U.S. patent application Ser. No. 811,227, clockwise rotation of the trip arm 162 is operable to release the toggle mechanism 34 causing the contacts 126, 128 to move to the open position.

Figure 3B:
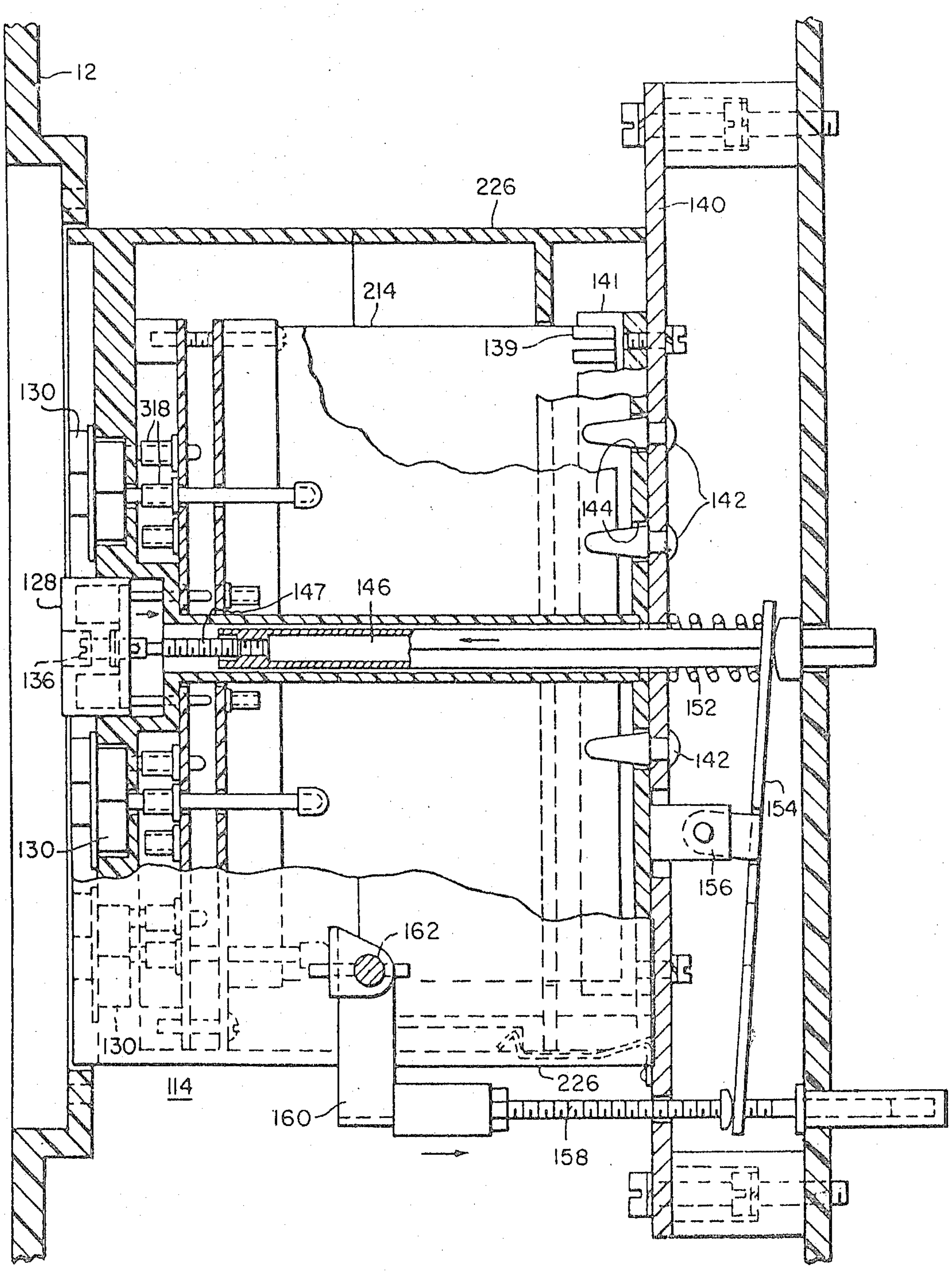
FIG. 3B is a view similar to FIG. 3A, with the rating adjuster only partially inserted.
Figure 3C:
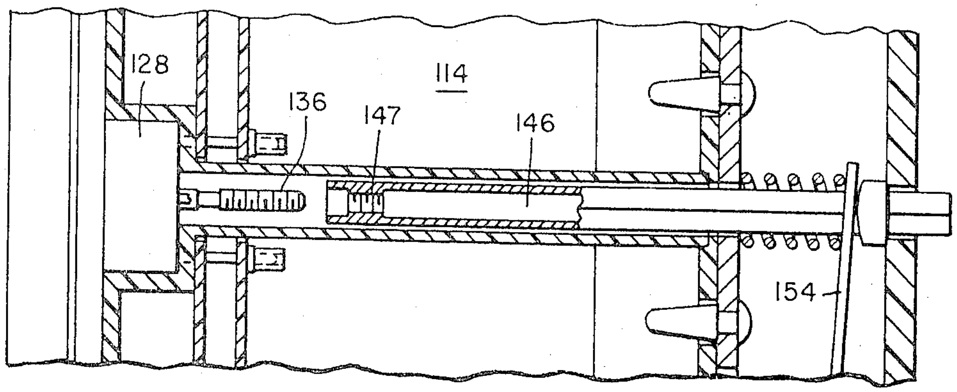
FIG. 3C is a view similar to FIGS. 3A and 3B, with an improper rating adjuster inserted.

With the rating aduster 128 fully inserted into the recess into the housing of the trip unit 114, it can be seen that the screw 136 can be rotated to engage the threaded portion 147 of the tube 146, thereby drawing the tube 146 to the left against the biasing action of the spring 152. The lever 154 is then pivoted, allowing, through the action of the push rod 158, a counterclockwise rotation of the trip arm 162, removing the breaker from the trip-free condition and allowing it to be normally operated to any desired open or closed position. If the rating plug 128 is not fully inserted into the housing of the trip unit 114 (as in FIG. 3B), the compression spring 152 will bias the lever 154 to the right, causing the push rod 158 to be moved to the left, thereby maintaining the trip arm 162 in a position of clockwise rotation. This position, as is described in the aforementioned U.S. patent application Ser. No. 811,227, maintains the circuit breaker in the trip-free condition, whereby it is not possible to cause the contacts 126, 128 to close. The position of the threaded portion 147 within the tube 146 and the length of the screw 136 are coordinated such that only compatible rating plugs, trip units, and circuit breakers will allow the screw 136 to engage the tube 146 in such a manner as to remove the breaker from the trip-free condition. This can be seen most clearly in FIGS. 3C and 3D wherein an improper rating plug has been inserted into the trip unit 114. In FIG. 3C, the length of the screw 136 is not sufficient to extend into the threaded portion 147 of the tube 146. Thus, even though the rating plug 128 is fully inserted into the trip unit housing, the tube 146 is not drawn up to the left, allowing the spring 152 to bias the linkage 154, 158, 160, 162 so as to maintain the circuit breaker in the trip-free condition.

Figure 3D:
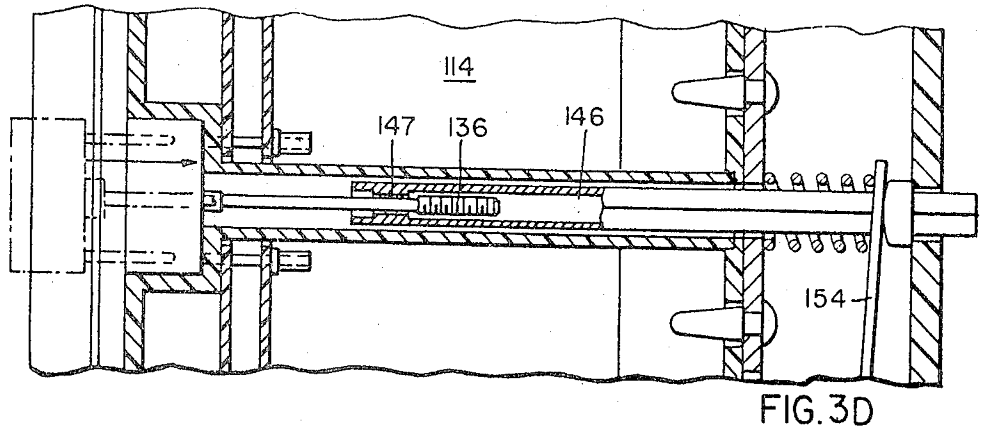
FIG. 3D is a view similar to FIG. 3C with a different type of improper rating adjuster.

Similarly, in FIG. 3D, an improper rating adjuster 128 having a screw 136 which is too long is inserted. The threaded portion of the screw 136 thus extends beyond the threaded portion 147 and is unable to engage and draw up the tube 146.

Figure 8:
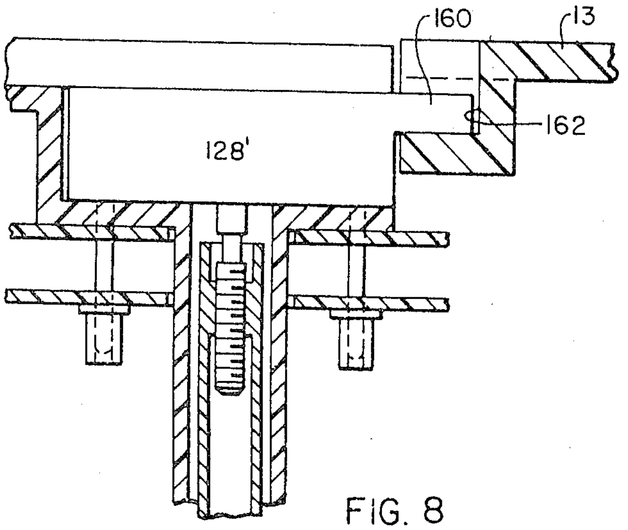
FIG. 8 is a sectional view of a rating adjuster of an alternative embodiment of the invention.

An alternative embodiment of the invention is shown in FIG. 8 wherein there is disclosed a rating plug 128' having an extending overhang member 160 which seats in a formed recess 162 of the circuit breaker housing cover 13. The extending member 160 thus prevents the cover 13 from being removed unless the rating plug 128 is first removed. As described previously, removal of the rating plug 128 is such as to allow the spring 152 to operate the trip linkage 154, 158, and 160 to rotate the trip arm 162 and cause the circuit breaker contacts to open. Thus, it is insured that the contacts of the circuit breaker will be opened whenever the cover 13 has been removed.

Engaging means other than the threads of the screw 136 and tapped tube 146 could also be used to implement the principles of the present invention. For example, a slot could be cut in the tube 146 and adapted to receive a corresponding perpendicularly extending pin in the screw 136. By proper adjustment of the distance of the slot from the mounting plate 140, coordination could be provided to insure that only proper rating plugs would engage the tube 146, allowing the circuit breaker to be removed from the trip-free condition.

By providing the proper coordination between rating plugs and circuit breakers, the present invention allows the same mold to be used for all rating plugs, and another common mold to be used for all circuit breaker housings within a given circuit breaker family. This provides an advantage over the prior art wherein coordination was provided by molded keys and recesses in the rating plugs and housings, respectively. This required a number of molds for the complete circuit breaker line, thereby incurring a higher cost. It can be seen therefore that the present invention provides a corrdinated system of removable rating adjusters and circuit breakers providing a significant advantage over the prior art at a lower cost.

What is claimed is:

1. A circuit interrupter, comprising:

a housing;

a circuit breaker structure mounted within said housing and comprising a pair of separable contacts operable between open and closed positions to interrupt an electrical circuit releasable means operable from a latched to a tripped position to automatically open said contacts, and an operating mechanism for moving said contacts between open and closed positions;

trip means responsive to current flow through said contacts for actuating said releasable means from the latched to the tripped position to automatically open said contacts upon detection of overcurrent conditions, said trip means comprising a removable interchangeable rating adjuster for determining the level of overcurrent which will cause said trip means to operate; and interlock means operable between a first position maintaining said releasable means in a tripped position and a second position allowing said releasable means to assume the latched position, said interlock means comprising first mechanical mating means separate from said housing and having a mechanical structure coordinated with the electrical characteristics of said trip means;

said rating adjuster comprising second mechanical mating means having a mechanical structure coordinated with the electrical characteristics of said rating adjuster and positioned to cooperate with said first mating means to operate said interlock means to said second position when a proper rating adjuster electrically compatible with said trip means is fully mounted upon said circuit interrupter;

said first and second mating means cooperating to prevent operation of said interlock means to said second position when a rating adjuster not electrically compatible with said trip means is mounted upon said circuit interrupter.

2. A circuit interrupter as recited in claim 1 wherein said first mating means comprises a mounting member having first engaging means, and said second mating member comprises second engaging means.

3. A circuit interrupter as recited in claim 2 wherein said first and second engaging means each comprise cooperating threaded members.

4. A circuit interrupter as recited in claim 3 wherein said first engaging means comprises a tube having threads tapped on the inner surface thereof, and said second engaging means comprising a mounting screw; said tube being positioned within said housing to receive said mounting screw when said rating adjuster is inserted in said trip means.

5. A circuit interrupter as recited in claim 4 wherein only a portion of said tube and said screw are threaded, the position of said threaded portions being related to electrical characteristics of said circuit interrupter and said rating adjuster such that the threaded portions of said screw and said tube can be engaged only when a rating adjuster which is electrically compatible with said circuit interrupter is completely inserted therein.

6. A circuit interrupter as recited in claim 4 wherein said trip means comprises an enclosure removable from said housing and an electronic circuit disposed therein, said tube extends through said enclosure, and said rating adjuster comprises resistance means electrically connected to said electronic circuit when said rating adjuster is completely inserted in said circuit interrupter.

7. A circuit interrupter as recited in claim 1 wherein said housing comprises a removable cover having a recess formed therein, and said rating adjuster comprises an extending member positioned in said recess when said rating adjuster is fully mounted on said circuit interrupter to prevent removal of said cover, thereby requiring removal of said rating adjuster to permit removal of said cover and insuring that said contacts are in the open position whenever said cover is removed.

8. A circuit interrupter, comprising:

a housing;

a circuit breaker structure mounted with said housing and comprising a pair of separable contacts operable between open and closed positions to interrupt an electrical circuit releasable means operable from a latched to a tripped position to automatically open said contacts, and an operating mechanism for moving said contacts between open and closed positions only when said releasable means are in the latched position;

trip means responsive to current flow through said contacts for actuating said releasable means from the latched to the tripped position to automatically open said contacts upon detection of overcurrent conditions, said trip means comprising an externally accessible removable interchangeable rating adjuster for determining the level of overcurrent which will cause said trip means to operate; and interlock means operable between a first position to maintain said releasable means in a tripped position, and a second position allowing said releasable means to assume the latched position, said interlock means comprising first mating means separable from said housing and having a mechanical structure coordinated with the electrical characteristics of said trip means;

said rating adjuster comprising second mating means having a mechanical structure coordinated with the electrical characteristics of said rating adjuster and positioned to cooperate with said first mating means to operate said interlock means to said second position when a proper rating adjuster electrically compatible with said trip means is fully mounted upon said circuit interrupter;

said first and second mating means cooperating to prevent operation of said interlock means to said second position when a rating adjuster not electrically compatible with said trip means is mounted in said housing.

9. A circuit interrupter as recited in claim 8 wherein said first mating means comprises a mounting member having first engaging means, and said second mating member comprises second engaging means.

10. A circuit interrupter as recited in claim 9 wherein said first and second engaging means each comprise cooperating threaded members.

11. A circuit interrupter as recited in claim 10 wherein said first engaging means comprises a tube having threads tapped on the inner surface thereof, and said second engaging means comprising a mounting screw; said tube being positioned within said housing to receive said mounting screw when said rating adjuster is inserted in said trip means.

12. A circuit interrupter as recited in claim 11 wherein only a portion of said tube and said screw are threaded, the position of said threaded portions being related to electrical characteristics of said circuit interrupter and said rating adjuster such that the threaded portions of said screw and said tube can be engaged only when a rating adjuster which is compatible with said circuit interrupter is completely inserted therein.

13. A circuit interrupter as recited in claim 11 wherein said trip means comprises an enclosure removable from said housing, and an electronic circuit disposed therein, said tube extending through said enclosure, and said rating adjuster comprises resistance means electrically connected to said electronic circuit when said rating adjuster is completely inserted in said circuit interrupter.

14. A circuit interrupter as recited in claim 8 wherein said housing comprises a removable cover having a recess formed therein, and said rating adjuster comprises an extending member positioned in said recess when said rating adjuster is fully mounted on said circuit interrupter to prevent removal of said cover, thereby requiring removal of said rating adjuster to permit removal of said cover and insuring that said contacts are in the open position whenever said cover is removed.

15. A circuit interrupter, comprising:

a housing;

a circuit breaker structure mounted within said housing and comprising a pair of separable contacts operable between open and closed positions to interrupt an electrical circuit, releasable means operable from a latched to a tripped position to automatically open said contacts, and an operating mechanism for moving said contact between open and closed positions;

a removable externally accessible trip device mounted in said housing and responsive to current flow through said contacts to operate said releasable means to the tripped position to automatically open said contacts upon detection of overcurrent conditions, said trip device comprising an externally accessible removable rating adjuster for determining the level of overcurrent which will cause said releasable means to operate, said rating adjuster having a mechanical configuration coordinated with the electrical characteristics of said rating adjuster; and interlock means mounted in said housing and having a mechanical configuration coordinated with the electrical characteristics of said circuit interrupter such that a trip unit and rating adjuster can be fully inserted into said housing only when the mechanical configuration of said rating adjuster is compatible with the mechanical configuration of said interlock means;

said interlock means cooperating with said trip unit to operate said releasable means to maintain said contacts in an open position unless said trip unit and said rating adjuster are fully inserted in said housing.

16. A circuit interrupter as recited in claim 15 wherein said trip unit comprises an electronic circuit.

* * * * *